(12) United States Patent
Sanjabi et al.

(10) Patent No.: US 12,036,949 B2
(45) Date of Patent: Jul. 16, 2024

(54) RUNNING BOARD BRACKET

(71) Applicant: ABC TECHNOLOGIES INC., Toronto (CA)

(72) Inventors: Farshid Sanjabi, Richmond Hill (CA); James W. Wells, Maidstone (CA); Richard Louis Hamilton, Novi, MI (US); Peter Bollmann, Alliston (CA); Michael Kurt Profyt, Beeton (CA); Jarek R. Gorecki, Etobicoke (CA); Avinash Jayakumar, Mississauga (CA)

(73) Assignee: ABC TECHNOLOGIES INC. (CA)

( * ) Notice: Subject to any disclaimer, the term of this patent is extended or adjusted under 35 U.S.C. 154(b) by 418 days.

(21) Appl. No.: 17/485,798

(22) Filed: Sep. 27, 2021

(65) Prior Publication Data

US 2022/0097607 A1    Mar. 31, 2022

Related U.S. Application Data

(60) Provisional application No. 63/213,878, filed on Jun. 23, 2021, provisional application No. 63/084,172, filed on Sep. 28, 2020.

(51) Int. Cl.
*B60R 3/00* (2006.01)
*B62D 29/04* (2006.01)

(52) U.S. Cl.
CPC ............ *B60R 3/002* (2013.01); *B62D 29/048* (2013.01)

(58) Field of Classification Search
CPC .......... B60R 3/02; B60R 3/002; B62D 29/048
See application file for complete search history.

(56) References Cited

U.S. PATENT DOCUMENTS

| | | | | |
|---|---|---|---|---|
| 5,382,035 A * | 1/1995 | Waddington | ............ | B60R 3/002 280/169 |
| 8,827,294 B1 * | 9/2014 | Leitner | ..................... | B60R 3/02 280/166 |
| 10,526,486 B2 * | 1/2020 | Miyamoto | .............. | B32B 27/34 |

* cited by examiner

*Primary Examiner* — Bryan A Evans
(74) *Attorney, Agent, or Firm* — McDonald Hopkins LLC

(57) ABSTRACT

A bracket for mounting a vehicle running board to a vehicle. The bracket includes an L-shaped main body having a bottom support panel adapted to receive and fixedly retain the running board, a top support panel adapted to be fixedly attached to an inboard surface of a vehicle rocker panel, and intermediate support panel adapted to be fixedly attached to a pinch weld formed as part of the rocker panel.

16 Claims, 8 Drawing Sheets

RUNNING BOARD BRACKET

CROSS-REFERENCE TO RELATED APPLICATIONS

This application claims the benefit of U.S. Provisional Application No. 63/084,172, filed Sep. 28, 2020, and U.S. Provisional Application No. 63/213,878, filed Jun. 23, 2021, each of which is hereby incorporated by reference in its entirety for all purposes.

FIELD OF THE INVENTION

The present invention relates to the field vehicle running boards. More specifically, the present invention relates to a bracket system for mounting a running board to a vehicle.

BACKGROUND OF THE INVENTION

Running boards or assist steps, are often mounted on vehicles for assisting the user to climb into and out of the vehicle. Such running boards also have decorative function and are often added as an accessory either as part of an original installation or as part of an aftermarket installation to add to the vehicle aesthetics.

One such running board is illustrated in Applicant's U.S. Pat. No. 8,016,309 (issued Sep. 13, 2011), the contents of which are incorporated by reference. U.S. Pat. No. 8,016,309 details a running board assembly for mounting to a vehicle such as a truck, the assembly including an extruded running board body and a cover member. The extruded running board body is made from an extrudable plastic and the cover member is made of a material having the desired exterior finish. The cover member may be metallic and have the appearance of a chrome or polished finish. The cover extends over the upper and outboard surface of the running board body to provide the desired appearance characteristics. As generally known in the art, running boards of this and other designs are affixed to the vehicle using one or more mounting brackets.

Running board mounting brackets are constructed in a manner that provides a required strength performance, generally quantified as an allowable degree of deflection under a given load. To achieve this, prior art mounting brackets have been constructed of traditional materials (i.e., steel), and have generally had robust constructions, without regard to the overall weight being added to the vehicle. With a move to automotive lightweighting, in particular with the introduction of electric/hybrid vehicles, a more light weight construction that provides the required strength performance would be an attractive option.

SUMMARY OF THE INVENTION

Embodiments hereof relate to a bracket for mounting a vehicle running board to a vehicle. The bracket includes an L-shaped main body having a bottom support panel adapted to receive and fixedly retain the running board, a top support panel adapted to be fixedly attached to an inboard surface of a vehicle rocker panel, and intermediate support panel adapted to be fixedly attached to a pinch weld formed as part of the rocker panel. The bracket is formed of a thermoplastic material.

Embodiments hereof also relate to a bracket for mounting a vehicle running board to a vehicle. The bracket includes an L-shaped main body having a bottom support panel adapted to receive and fixedly retain the running board, a top support panel adapted to be fixedly attached to an inboard surface of a vehicle rocker panel, and intermediate support panel adapted to be fixedly attached to a pinch weld formed as part of the rocker panel. The bracket is formed of a polypropylene and carbon fiber blend.

Embodiments hereof also relate to a bracket for mounting a bracket for mounting a vehicle running board to a vehicle. The bracket includes a main body having a bottom support panel adapted to receive and fixedly retain the running board, a top support panel adapted to be fixedly attached to a structural member of a vehicle, and an intermediate support panel adapted to be fixedly attached to second location of the structural member. The bracket is formed of a thermoplastic material.

Embodiments hereof also relate to a bracket for mounting a bracket for mounting a vehicle running board to a vehicle. The bracket includes a main body having a running board support panel adapted to receive and fixedly retain the running board, an upright support panel adapted to be fixedly attached to a structural member of a vehicle, and a lower support panel adapted to be fixedly attached to second location of the structural member. The bracket is formed of a thermoplastic material.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale, and the directions indicated are relative to the bracket.

DETAILED DESCRIPTION OF EMBODIMENTS OF THE PRESENT INVENTION

Figure 1:
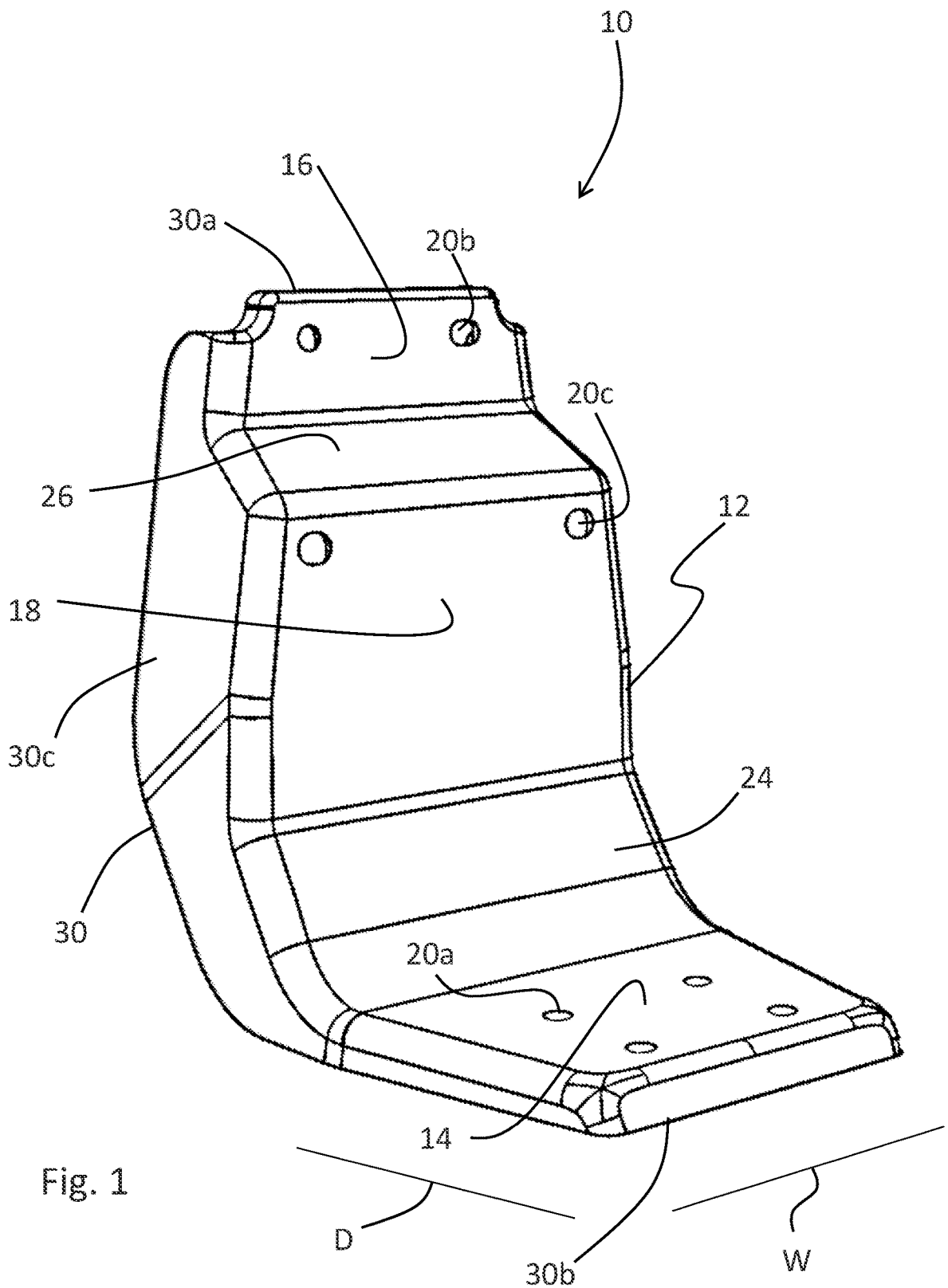
FIG. 1 is a front perspective view of a bracket according to a first embodiment of the invention.
Figure 2:
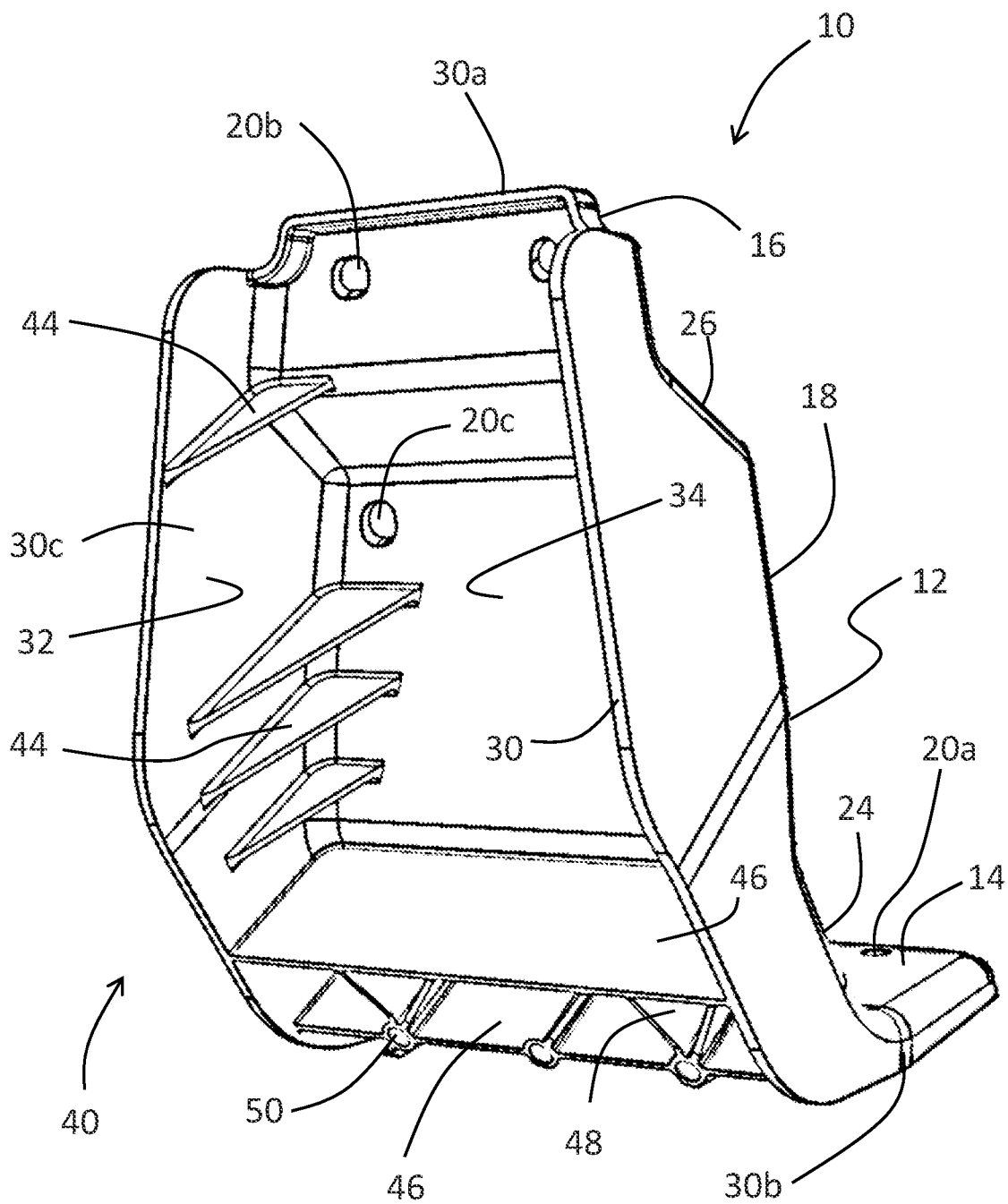
FIG. 2 is a rear perspective view of the bracket of FIG. 1.
Figure 3:
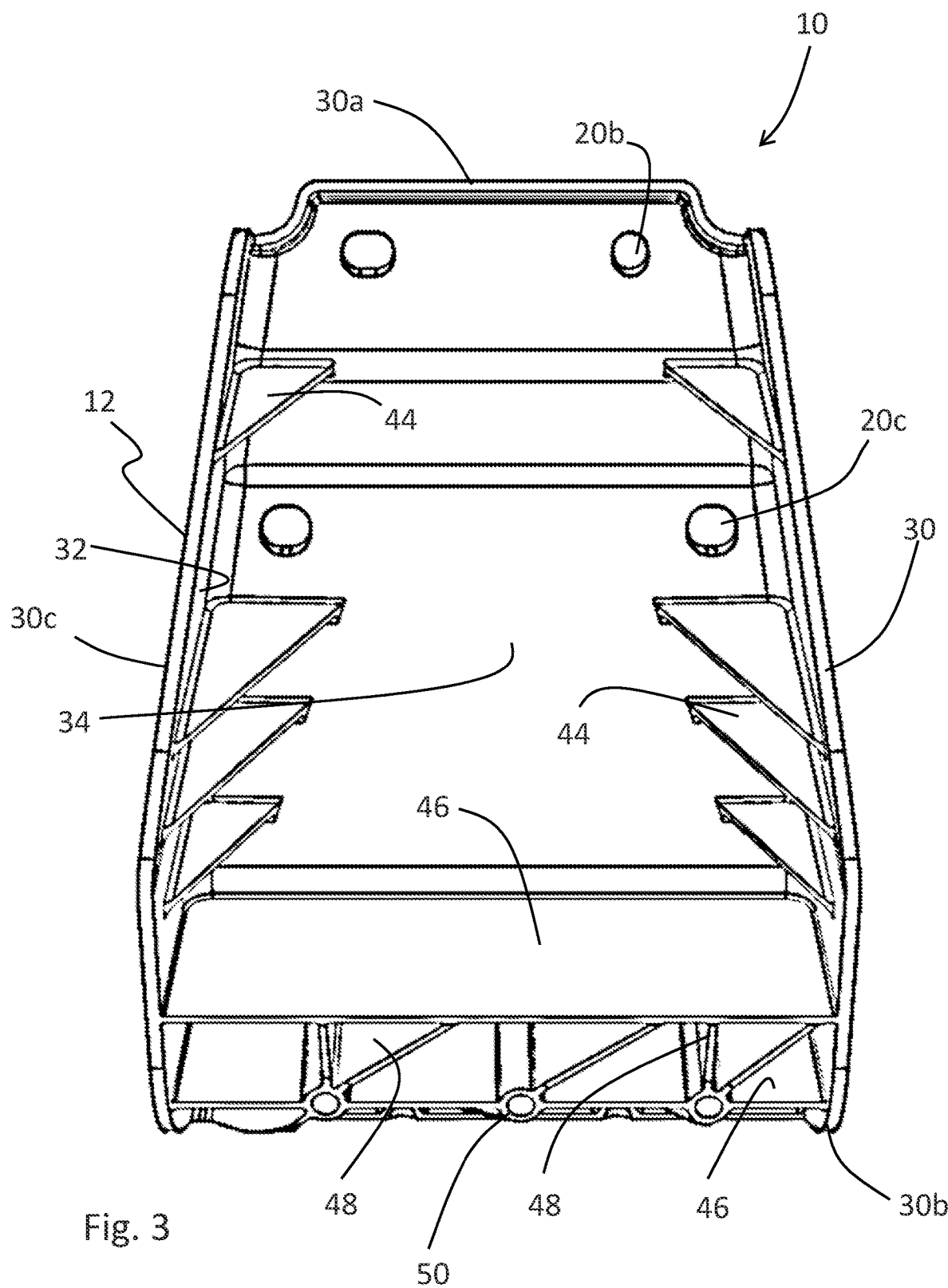
FIG. 3 is a rear view of the bracket of FIG. 1.
Figure 4:
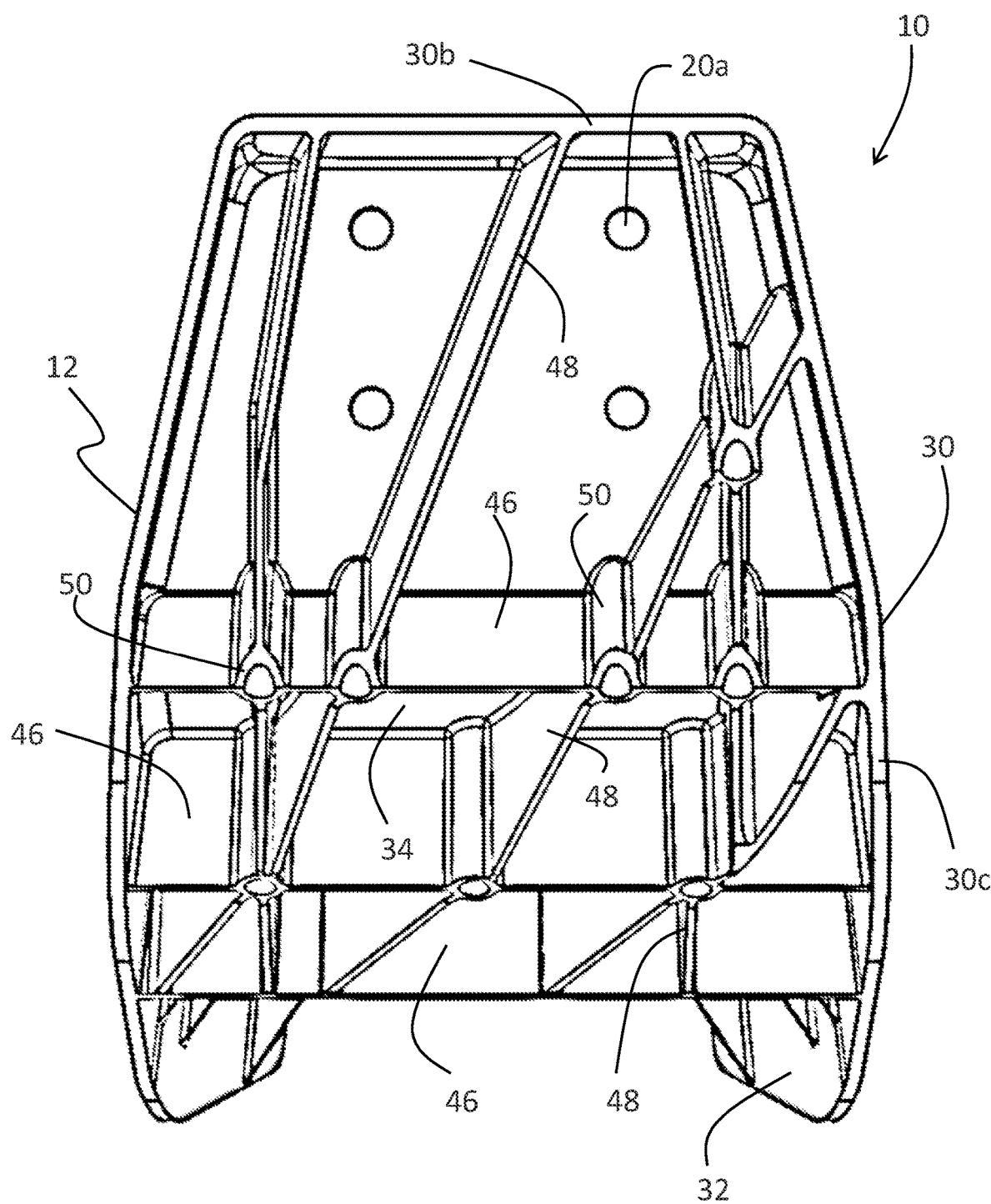
FIG. 4 is a bottom view of the bracket of FIG. 1.

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology with respect to mounting running boards on vehicles such as trucks, the invention may also be used for mounting running boards on other vehicle types, as well as for mounting step surfaces on non-automotive structures. Furthermore, there is no intention to be bound by any expressed or implied theory presented in the preceding technical field, background, brief summary or the following detailed description.

It should be noted that in the description, terms such as forward, front and derivations of these terms are intended to mean or refer to an orientation directed towards, or a location situated towards, the front of the vehicle or component in question relative to its orientation within a vehicle. Similarly, terms such as rearward, rear and derivations of these terms are intended to mean or refer to an orientation directed towards, or a location situated towards, the back of the vehicle or component in question relative to its orientation within a vehicle. Terms such as up, upper, upward, top and derivations of these terms are intended to mean or refer to an orientation that is above, on a top side, or in a region of a top area of the vehicle or component in question relative to its orientation within a vehicle. Terms such as lower, down, downward, bottom and derivations of these terms are intended to mean or refer to an orientation that is below, on a bottom side, or in a region of a bottom area of the vehicle or component in question relative to its orientation within a vehicle. The term outer, outboard, outside and derivations of these terms is intended to mean or refer to an orientation directed towards, or a location situated outwardly from the side of the vehicle or component in question relative to its orientation within a vehicle. The term inner, inboard, inside and derivations of these terms is intended to mean or refer to an orientation directed towards, or a location situated towards a longitudinal centerline of the vehicle, or component in question relative to its orientation within a vehicle.

In addition, the terms "preferred," "preferably," or "in particular," "for example" or similar terms are used in association with optional features without thereby restricting alternative embodiments. Thus, features which are introduced by these terms are optional features, and there is no intention to restrict the scope of protection of the claims and, in particular, the independent claims by means of these features. Thus, as a person skilled in the art will recognize, the invention can also be implemented using different embodiments. In a similar way, features which are introduced by "in one embodiment of the invention" or by "in one illustrative embodiment of the invention" are understood to be optional features without any intention thereby to restrict alternative embodiments or the scope of protection of the independent claims. Moreover, these introductory expressions are not intended to affect all the ways of combining the features introduced thereby with other features, whether optional or non-optional features.

Embodiment 1

Turning now to FIGS. 1 through 4, shown is a bracket 10 for mounting a running board (not shown) to a vehicle. The bracket 10 includes a generally L-shaped main body 12 having a bottom support panel 14 adapted to receive and fixedly retain the running board. The main body 12 also includes a top support panel 16 adapted to be fixedly attached to an inboard surface of the vehicle rocker panel. Intermediate the bottom support panel 14 and the top support panel 16, the main body 12 includes an intermediate support panel 18. The intermediate support panel 18 is adapted to be fixedly attached to a pinch weld formed as part of the rocker panel. With this configuration of the bracket 10, the top and intermediate support panels 16, 18 are arranged in a generally vertical orientation, and serve to retain the bracket 10 upon the vehicle, while the bottom support panel 14 is arranged in a generally horizontal orientation, and serves to support the running board situated there-on.

Each of the bottom, intermediate and top support panels 14, 18, 16 includes at least one set of fastener openings to facilitate attachment of the bracket to the vehicle and/or running board using suitable fasteners. Suitable fasteners will include but are not limited to threaded fasteners. As shown, the bottom support panel 14 includes four fastener openings 20a; the top support panel 16 includes two fastener openings 20b; the intermediate support panel 18 includes two fastener openings 20c.

The width W of the bracket 10 and the depth D provided by the bottom support panel 14 is selected based on specific desired performance characteristics, such as maximum load supportable by the running board. As such, it will be appreciated that a range of widths W and depths D may be implemented depending on the intended function of the running board. The support surface 14 is generally planar, but may incorporate additional features such as projections (not shown) that cooperate with the running board to ensure proper fit and finish. As shown the bracket 10 includes a generally curved transition 24 from the bottom support panel 14 to the intermediate support panel 18. As will be appreciated, the transition from the bottom support panel 14 to the intermediate support panel 18 may be configured in a variety of ways, depending on the design characteristics of the running board to be mounted. The bracket 10 also includes an angled transition 26 from the top of the intermediate support panel 18 to the bottom of the top support panel 16. Accordingly, the bracket 10 is a continuous unitary structure from the top support panel 16 through to the bottom support panel 14.

To provide increased strength performance to the bracket 10, the entire continuous unitary structure defined by the support panels 14, 16, 18 and interconnecting transition elements 24, 26 include a structural flange 30. More specifically, the top support panel 16 includes the structural flange 30a arranged along a top edge thereof; the bottom support panel 14 includes the structural flange 30b arranged along the bottom edges thereof; the intermediate support panel 18 and adjacent transitions 24, 26 include the structural flange 30c arranged along the side edges thereof. The various structural flanges 30a, 30b, 30c (collectively structural flange 30) are all interconnected, therein forming a continuous structural flange 30.

The back side 40 additionally includes various reinforcement elements to further enhance the strength characteristics of the bracket 10. The reinforcement elements may include one or more corner braces 44 integrally connected to an inside surface 32 of the structural flange 30 and an inside surface 34 of the bracket 10, at various points along the continuous unitary structure defined by the support panels 14, 16, 18 and interconnecting transition elements 24, 26. The reinforcement elements may also include one or more wall braces 46 that span the width of the bracket 10 between the structural flanges 30c. The wall braces 46 are integrally connected to the inside surface 32 of the structural flange 30 and the inside surface 34 of the bracket 10, at various points along the continuous unitary structure, in particular in the region of the curved transition 24 and the bottom support panel 14. Additional reinforcement elements may also be provided in the form of intermediate cross braces 48, that span between adjacent wall braces 46, or between the wall brace and the surrounding structural flange 30. The cross braces 48 are integrally connected to the wall braces 46 and/or inside surface 32 of the structural flange 30, and an inside surface 34 of the bracket 10, at various points along the continuous unitary structure defined by the support panels 14, 16, 18 and interconnecting transition elements 24, 26. Where the cross braces 48 interconnect to the wall braces 46 is structural node 50 is generally provided. It will be appreciated that the arrangement of the reinforcement elements may take on various forms, and is not meant to be restricted to the arrangement exemplified in the drawings. The arrangement of the reinforcement elements is generally dictated by the strength performance required, and accordingly the number, position and types of reinforcement elements used will be dictated by the particular intended use.

Embodiment 2

Turning now to FIGS. 5 through 8, shown is an alternative embodiment of a bracket 110 for mounting a running board to a vehicle. The bracket 110 similarly includes a generally L-shaped main body 112 having a running board support panel 114 adapted to receive and fixedly retain the running board. The main body 112 also includes an upright support panel 116 adapted to be fixedly attached to a structural member (i.e., frame member) positioned inboard of the vehicle rocker panel. Intermediate the running board support panel 114 and the upright support panel 116, the main body 112 includes a first transition region 119 that establishes the angular relationship between the running board support panel 114 and the upright support panel 116. Continuing with the figures, the main body 112 is shown to include an additional lower support panel 121, adapted to be fixedly attached to a second location of the vehicle, for example a second location on the structural member. While the running board support panel 114 is arranged to extend in a direction that is generally outboard relative to the rocker panel of the vehicle, the lower support panel 121 is arranged to extend in a direction that is generally inboard relative to the rocker panel of the vehicle. Intermediate the upright support panel 116 and the lower support panel 121, the main body 112 includes a second transition region 123 that establishes the angular relationship between the upright support panel 116 and the lower support panel 121. With this configuration of the bracket 110, the upright support panel 116 is arranged in a generally vertical orientation, while the running board support panel 114 and the lower support panel 121 are arranged in a generally horizontal orientation. The upright and lower support panels 116, 121 serve to fixedly attach the bracket 110 to the vehicle, while the running board support panel 114 serves to support the running board situated there-on.

Each of the running board support panel 114, the upright support panel 116, and the lower support panel 121 includes at least one set of fastener openings to facilitate attachment of the bracket to the vehicle and/or running board using suitable fasteners. Suitable fasteners will include but are not limited to threaded fasteners. As shown, the running board support panel 114 includes two fastener openings 120a; the upright support panel 116 includes a single fastener opening 120b; the lower support panel 121 includes a single fastener opening 120c.

The width W of the bracket 110 and the depth D provided by the running board support panel 114 is selected based on specific desired performance characteristics, such as maximum load supportable by the running board. As such, it will be appreciated that a range of widths W and depths D may be implemented depending on the intended function of the running board. The support surface 114 is generally planar, but may incorporate additional features such as projections (not shown) that cooperate with the running board to ensure proper fit and finish. As stated above, the bracket 110 includes the first transition region 119 between the running board support panel 114 and the upright support panel 116, and includes the second transition region 123 between the upright support panel 116 and the lower support panel 121. With this arrangement, the bracket 110 is said to incorporate the running board support panel 114, the upright support panel 116, and the lower support panel 121 into a continuous unitary structure.

To provide increased strength performance to the bracket 110, the entire continuous unitary structure defined by the support panels 114, 116, 121 and the interconnecting first and second transition regions 119, 123 include additional structural elements. As shown, each of the support panels 114, 116, 121 include respective structural flanges 130. More specifically, the running board support panel 114 includes a structural flange 130a arranged to extend downwardly from the edges thereof; the upright support panel 116 includes a structural flange 130b arranged to extend in the outboard direction from the edges thereof; the lower support panel 121 includes a structural flange 130c arranged to extend downwardly from the edges thereof. The structural flanges 130a, 130b, 130c (collectively structural flange 130) are generally continuous throughout the main body 112, thus being an integral structural component of the continuous unitary structure.

Figure 5:
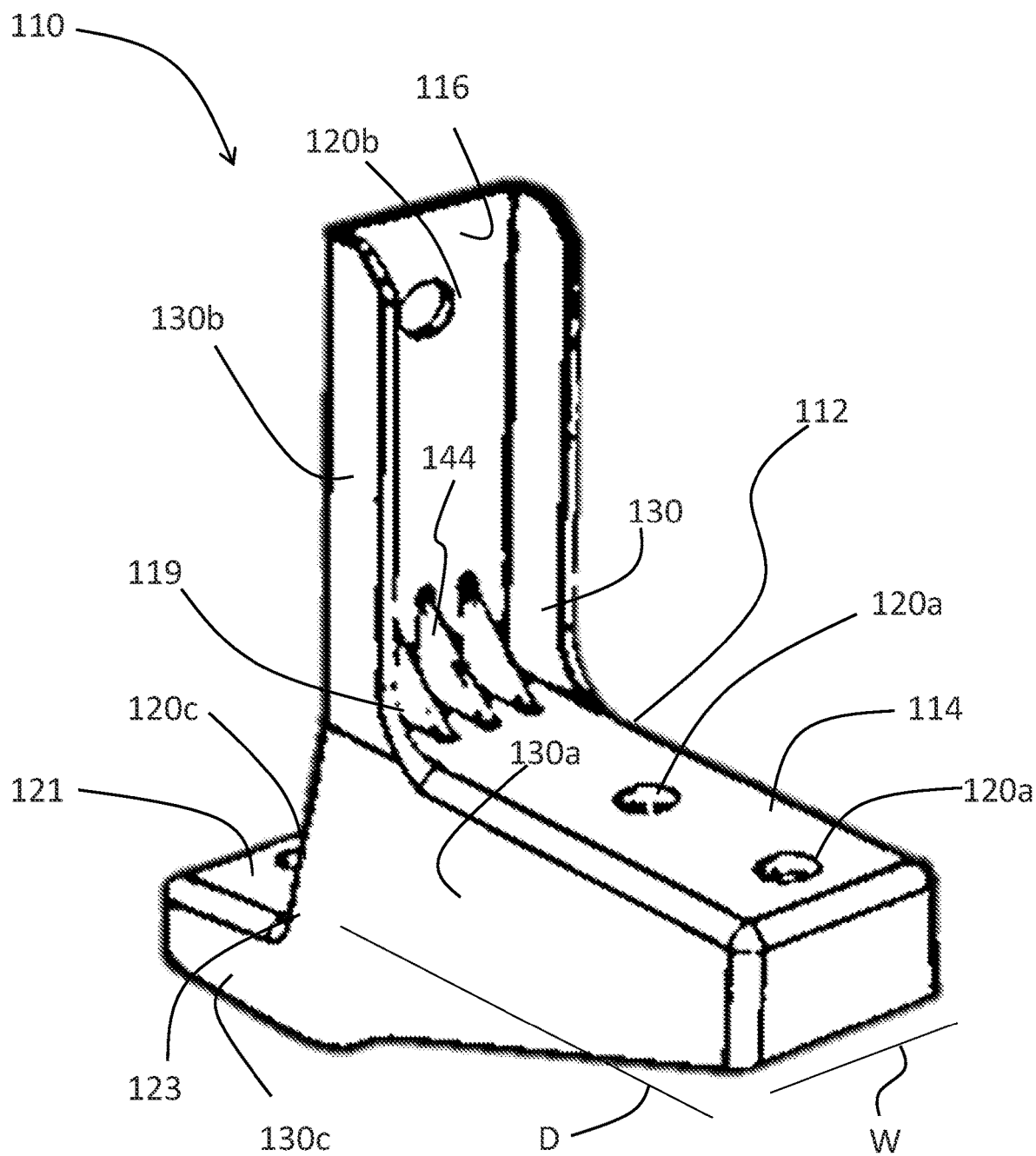
FIG. 5 is a front perspective view of a bracket according to a second embodiment of the invention.
Figure 6:
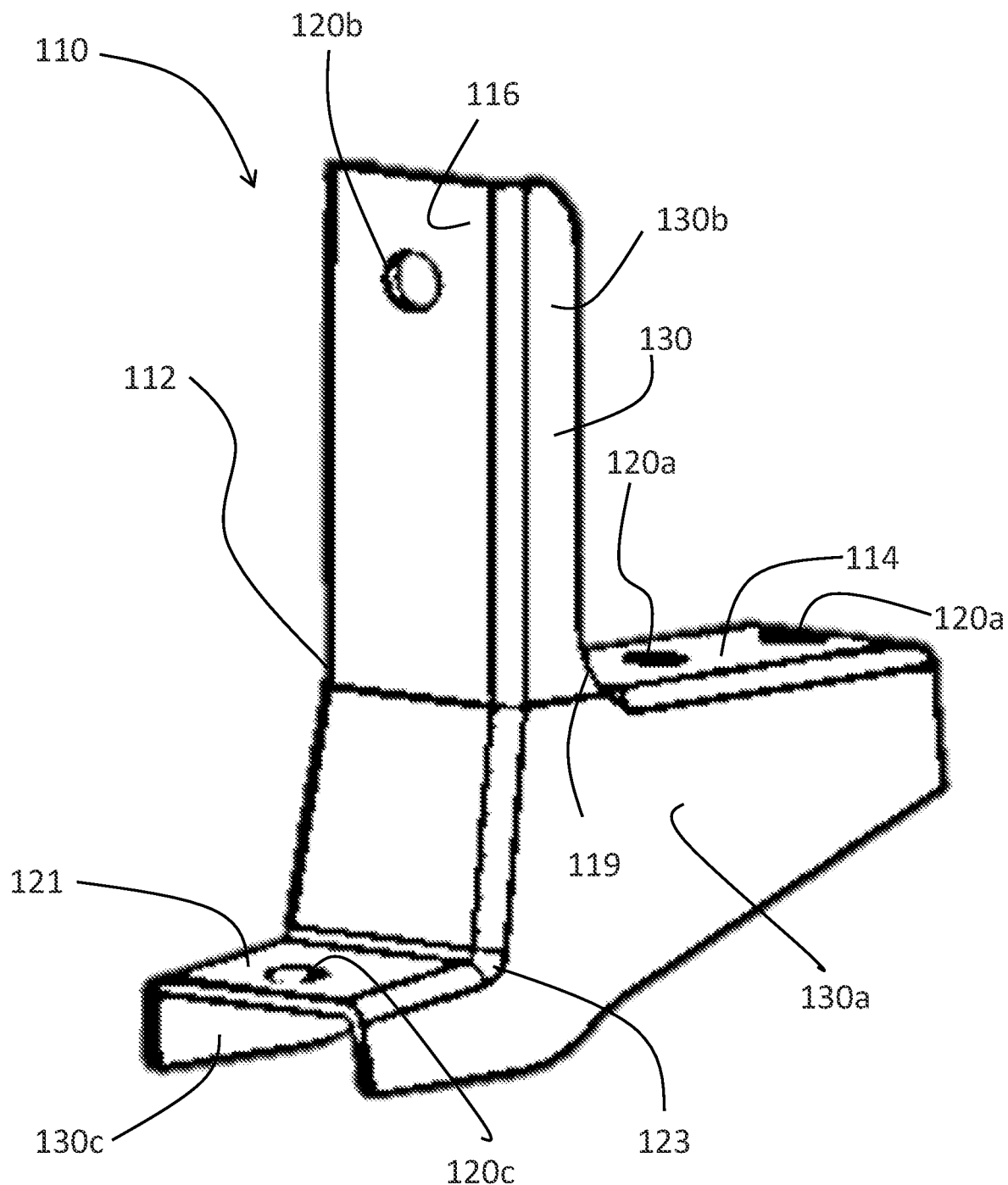
FIG. 6 is a rear perspective view of the bracket of FIG. 5.
Figure 7:
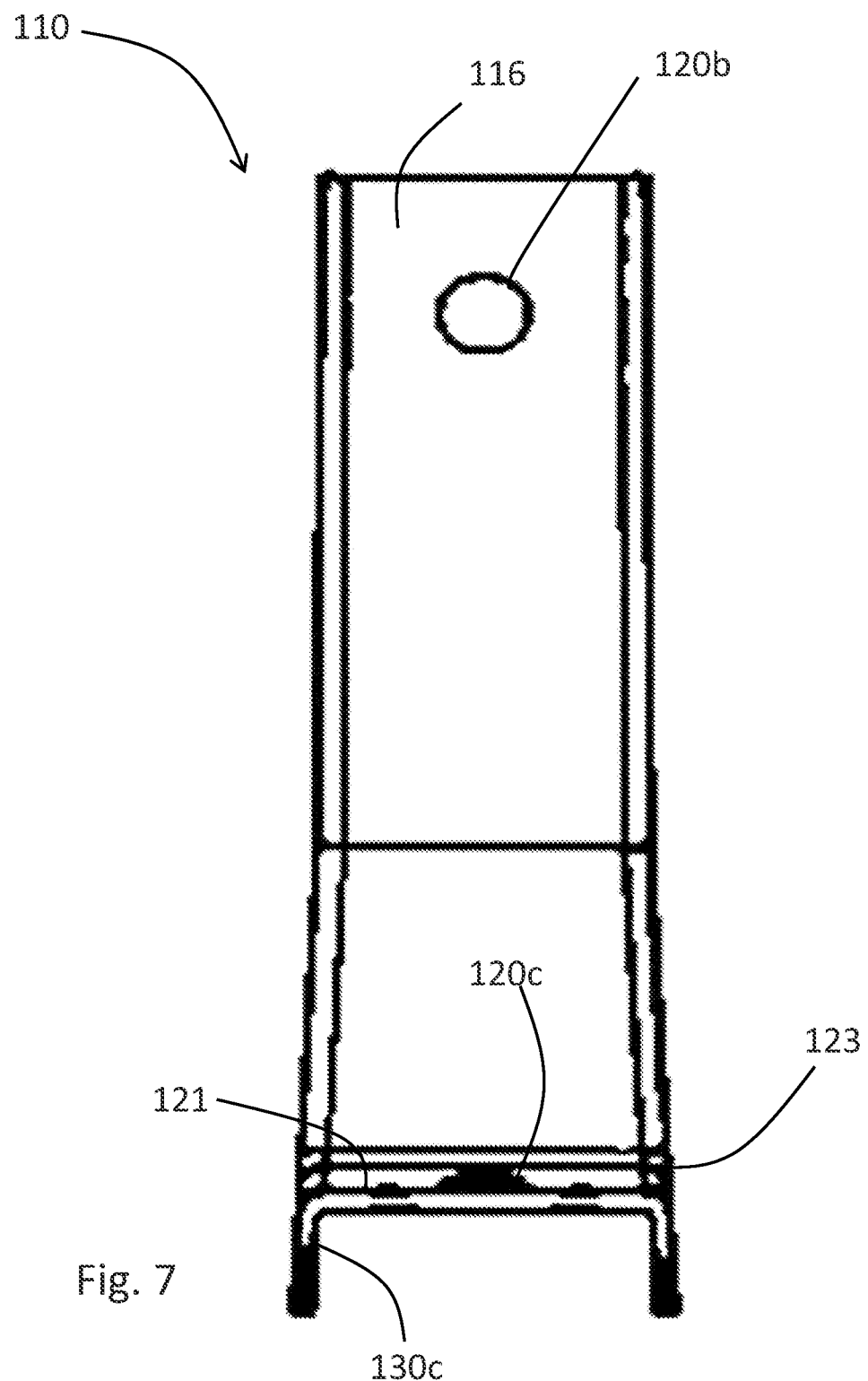
FIG. 7 is a front view of the bracket of FIG. 5.
Figure 8:
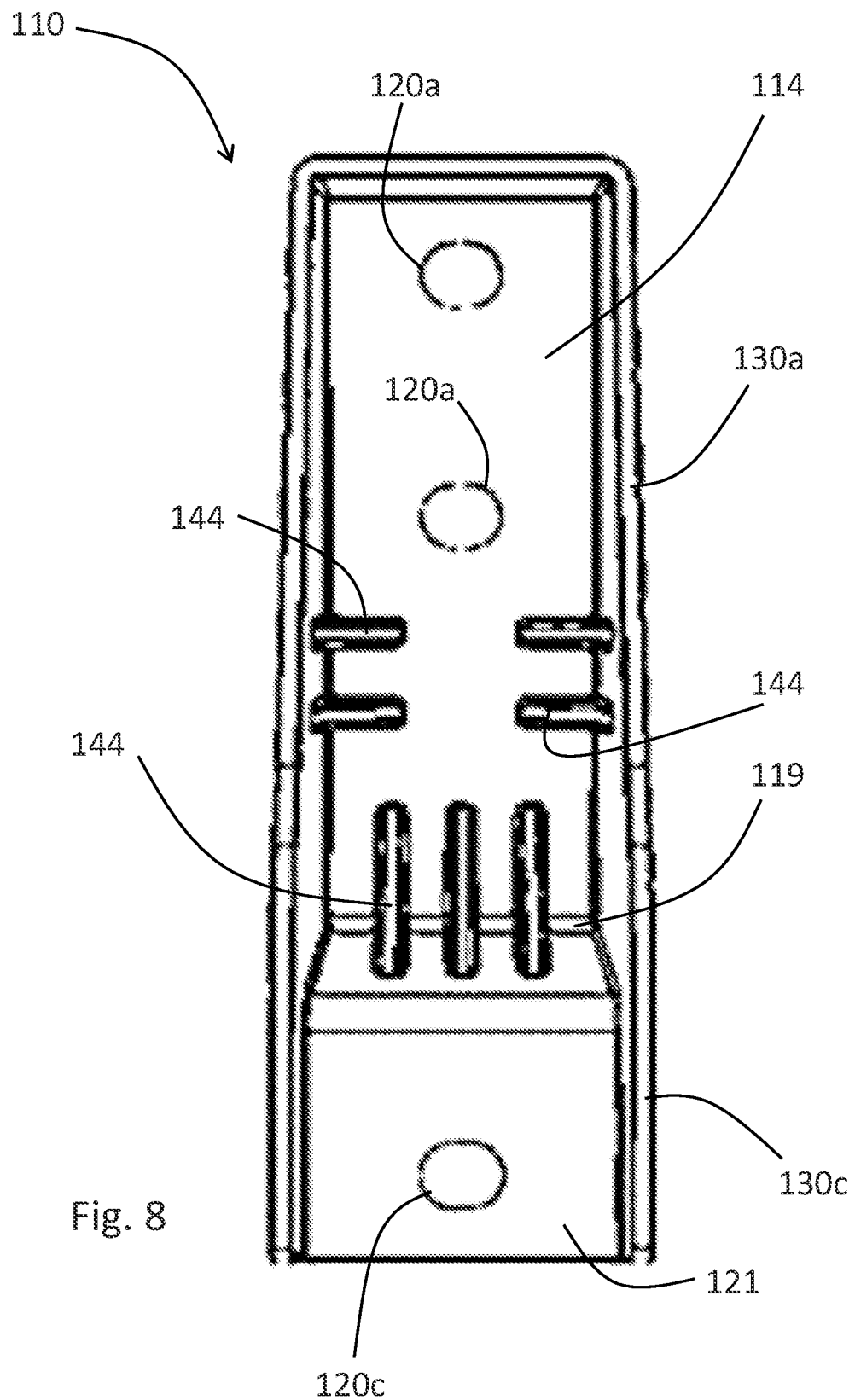
FIG. 8 is a bottom view of the bracket of FIG. 5.

The bracket 110 may additionally include various reinforcement elements to further enhance the strength characteristics of the bracket 110. The reinforcement elements may include one or more braces 144 provided at one or both of the first and second transition regions 119, 123. As shown in FIG. 5, a plurality of braces 114 are provided at the first transition region 119, between the running board support panel 114 and the upright support panel 116. Braces may also be provided at the transition between the structural flange 130 and the respective support panel 114, 116, 121 from which it extends, as shown for example in FIG. 8. The reinforcement elements may also include one or more wall braces (not shown) that span the width of the bracket 110 between the structural flanges 130. The wall braces may be integrally connected to an inside surface of the structural flange 130 and a planar surface of the support panel from which the structural flange 130 extends, and may be provided at various points along the continuous unitary structure, in particular in the region of the first and second transition regions 119, 123. Additional reinforcement elements may also be provided in the form of intermediate cross braces (not shown), that span between adjacent wall braces, or between the wall braces and the surrounding structural flange 130. The cross braces may be integrally connected to the wall braces and/or the inside surface of the structural flange 130, and an inside surface of the bracket 110, at various points along the continuous unitary structure defined by the support panels 114, 116, 121 and transition regions 119, 121. It will be appreciated that the arrangement of the reinforcement elements may take on various forms, and is not meant to be restricted to the arrangement exemplified in the drawings. The arrangement of the reinforcement elements is generally dictated by the strength performance required, and accordingly the number, position and types of reinforcement elements used will be dictated by the particular intended use.

The bracket 10, 110 may be constructed using a variety of thermoplastic materials, including but not limited to polypropylene, thermoplastic polyolefins (TPO), acrylonitrile-butadiene-styrene (ABS), polycarbonate (PC), polybutadiene terephthalate (PBT), polyethylene terephthalate (PET), nylon, polyvinyl chloride (PVC), polystyrene (PS), polyethylene (PPE), blends of the above materials, and a compound constructed of a biomass (cellulose, lignin, etc.) and blends of the above materials. with other suitable materials (e.g., fillers including, but not limited to carbon fiber, glass fibres, talk, etc.). In one exemplary embodiment, the bracket 10, 110 is formed of polypropylene combined with virgin or recycled carbon fiber. Both virgin and recycled carbon fiber are available commercially. For example, chopped reclaimed carbon fiber is available through Carbon Conversions (Lake City, South Carolina). Where the bracket 10 is formed from a blended polypropylene/carbon fiber, the amount of carbon fiber in the bracket 10 may range from 15% to 35% (w/w thermoplastic to CF), with specific quantities contemplated including 15%, 20%, 25%, 30%, and 35% (w/w). It will be appreciated that quantities of carbon fiber both above and below this range, as well as between the specific values noted above may also be suitably implemented.

The brackets 10, 110 detailed above are intended to replace conventional steel running board brackets, providing substantial weight savings, while also meeting or exceeding required structural and/or performance characteristics. When formed with a thermoplastic material supplemented with carbon fiber, the bracket 10, 110 can provide superior deformation performance, while having a reduced overall weight. For example, compared to steel brackets of similar design, the carbon fiber bracket 110 is generally ⅓ the weight, while being able to achieve desired performance with respect to maximum total deformation and total permanent deformation values. For example, in testing it was observed that the bracket 110 formed of a polypropylene/carbon fiber blend (carbon fiber added to 30% wt/wt) exhibited maximum total deformation reduced by up to approximately 80%, and total permanent deformation reduced by up to 50%. As demonstrated by this, although the carbon fiber replacement bracket is substantially lighter than the prior art steel design, the actual performance characteristics may be considerably improved.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A bracket for mounting a vehicle running board to a vehicle, the bracket comprising:
    a continuous, unitary main body having: i) a bottom support panel adapted to receive and fixedly retain the running board, ii) a top support panel adapted to be fixedly attached to a structural member of a vehicle, iii) an intermediate support panel adapted to be fixedly attached to second location of the structural member, and iv) a structural flange extending continuously around the each of the bottom, top, and intermediate support panels,
    wherein the bracket is formed of a thermoplastic material.

2. The bracket according to claim 1, further comprising a curved transition between the bottom support panel and the intermediate support panel.

3. The bracket according to claim 1, further comprising an angled transition between the intermediate support panel and the top support panel.

4. The bracket according to claim 1, further comprising reinforcement elements placed on an inside surface of at least one of the bottom, intermediate, and/or top panels of the main body.

5. The bracket according to claim 4, wherein the reinforcement elements connect to the structural flange and include at least one of a corner brace, a wall brace, and a cross brace.

6. The bracket according to claim 1, wherein the thermoplastic material additionally contains a filler or additive material.

7. The bracket according to claim 1, wherein the bracket is formed of a polypropylene and carbon fiber blend.

8. The bracket according to claim 1, wherein the bracket is formed of a polypropylene and up to 35% carbon fiber (% wt/wt).

9. The bracket according to claim 1, wherein the main body is L-shaped.

10. A bracket for mounting a vehicle running board to a vehicle, the bracket comprising:
    a main body having a running board support panel adapted to receive and fixedly retain the running board, an upright support panel adapted to be fixedly attached to a structural member of a vehicle, and a lower support panel adapted to be fixedly attached to second location of the structural member,
    wherein the bracket is formed of a thermoplastic material,
    wherein each of the running board support panel and the upright support panel include the addition of a structural flange, and
    wherein the structural flange included on the running board support panel is arranged to extend downwardly from the edges thereof, while the structural flange included on the upright support panel arranged to extend in the outboard direction from the edges thereof.

11. The bracket according to claim 10, wherein the main body is a continuous unitary structure.

12. The bracket according to claim 10, further comprising a first transition region between the running board support panel and upright support panel, and a second transition region between the upright support panel and the lower support panel.

13. The bracket according to claim 12, wherein at least one of the first and second transition regions includes additional reinforcement elements.

14. The bracket according to claim 10, wherein the thermoplastic material additionally contains a filler or additive material.

15. The bracket according to claim 10, wherein the bracket is formed of a polypropylene and carbon fiber blend.

16. The bracket according to claim 10, wherein the bracket is formed of a polypropylene and up to 35% carbon fiber (% wt/wt).

* * * * *